June 23, 1936.　　　　C. B. SPASE　　　　2,044,818

CLUTCH TESTING AND REBUILDING DEVICE

Filed Jan. 22, 1934　　　3 Sheets—Sheet 1

INVENTOR.
Charles B. Spase
BY
Fay, Oberlin & Fay
ATTORNEYS

June 23, 1936. C. B. SPASE 2,044,818
CLUTCH TESTING AND REBUILDING DEVICE
Filed Jan. 22, 1934 3 Sheets-Sheet 2
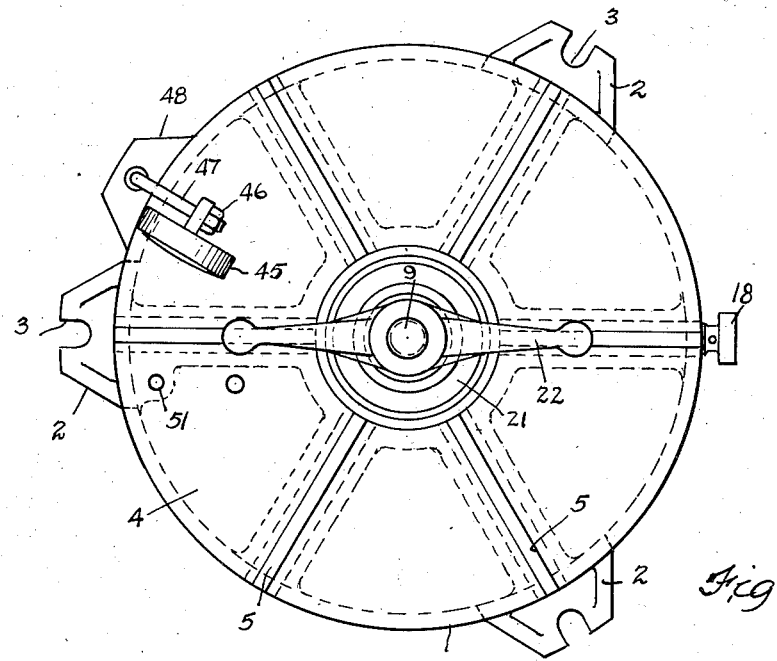
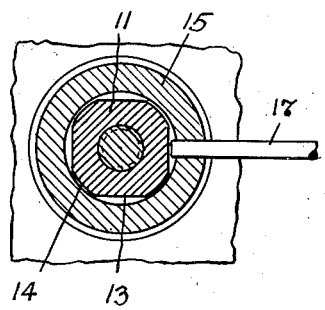
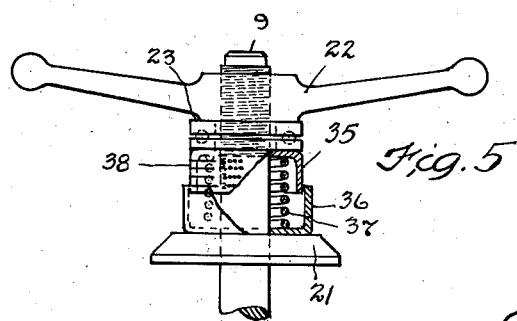
INVENTOR.
Charles B. Spase.
BY
Fay, Oberlin + Fay
ATTORNEYS.

Patented June 23, 1936

2,044,818

UNITED STATES PATENT OFFICE 2,044,818

CLUTCH TESTING AND REBUILDING DEVICE

Charles B. Spase, Syracuse, N. Y., assignor to Ira Saks

Application January 22, 1934, Serial No. 707,671
In Canada March 31, 1934

13 Claims. (Cl. 29—89)

The present invention relates to mechanism which is for the purpose of testing, checking, servicing and rebuilding of automotive clutches, particularly of the disc type. The device embodying the principle of my invention is best adapted to be used for repair and replacement work, such as in garages and repair shops.

It is an object of the invention to provide a simplified device which will adequately test a disc type clutch assembly when it has been rebuilt or repaired, in order that the work will conform to high standards of precision and quality. Another object of the invention is to provide a fixture wherein the operator will be enabled to properly test the alignment and adjustment of the driving and driven elements of the clutch assembly. Another object is to provide a fixture which will subject the clutch assembly to an actuating action analogous to that which it is subjected to when actually installed in use.

A further object is to provide means for checking the radial alignment of the clutch discs and the friction facing rings. Still another object is to provide means for determining the amount of pressure which is necessary to operate the clutch actuating levers and to overcome the pressure spring resistance.

It is also contemplated to provide means for retaining the clutch plate hub fasteners in proper position during the rebuilding operation. Additional objects and advantages shall become apparent as the following description proceeds.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
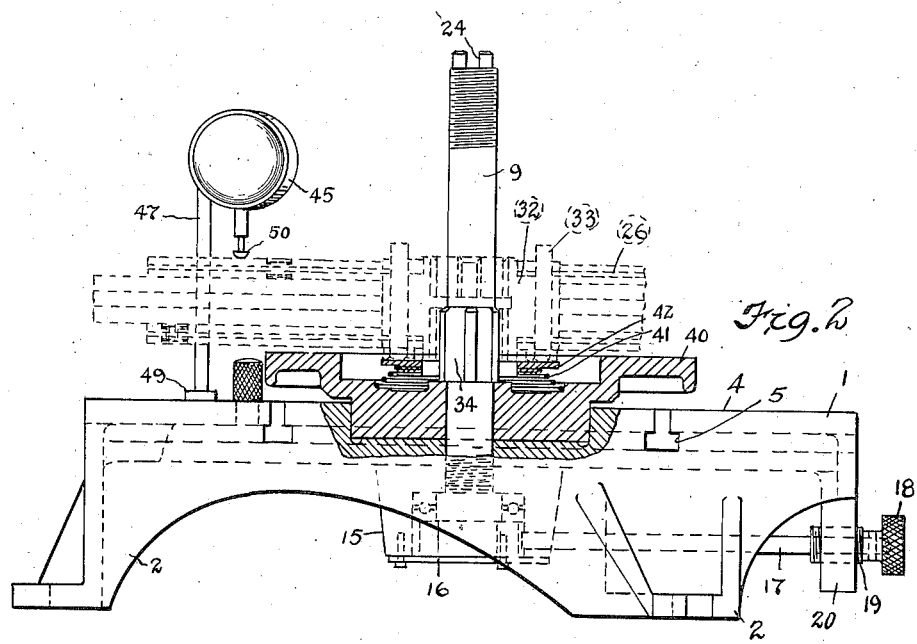
Figure 1:
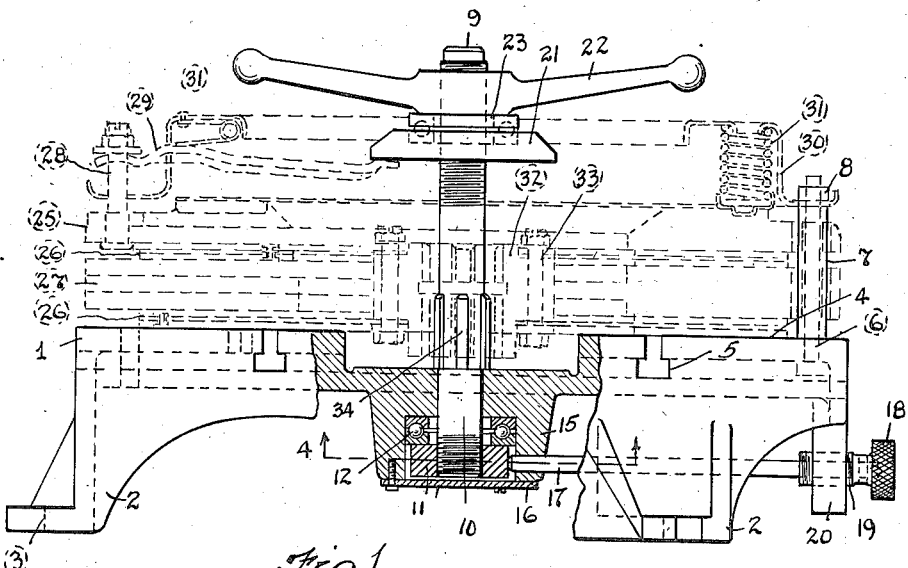
Figure 6:
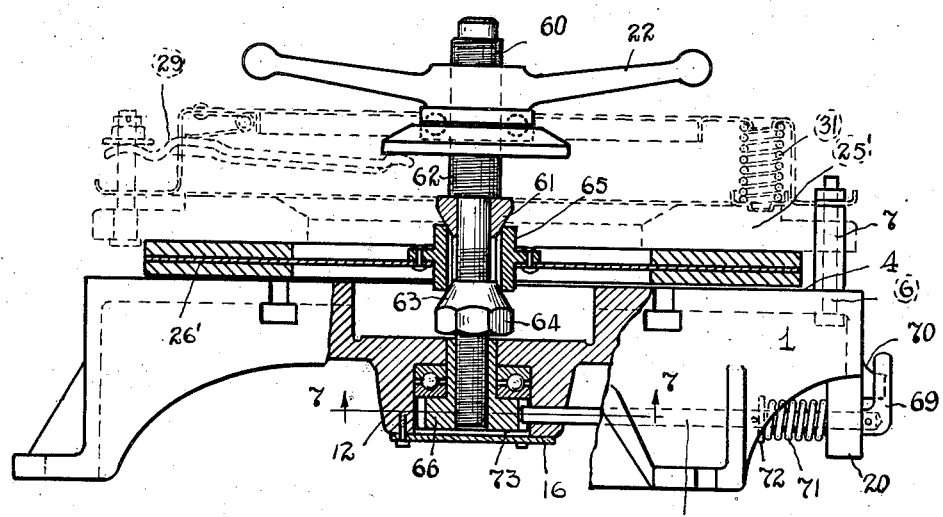
Figure 7:
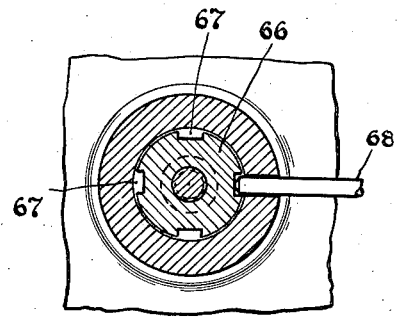

In said annexed drawings:

Fig. 1 is an elevational view of the device, partially in section, and showing a clutch assembly in dotted lines in position thereon; Fig. 2 is another elevational view of the device illustrating an alternative operation; Fig. 3 is a top plan view of the device; Fig. 4 is a sectional view taken substantially along the line 4—4 of Fig. 1; Fig. 5 is a fragmentary view of the actuating lever pressure gauge; Fig. 6 is an elevational view, partially in section, of a modified form of construction of the device; Fig. 7 is an enlarged detailed sectional view taken substantially on the line 7—7 of Fig. 6.

Before entering into a more detailed description, it is best that the problems of servicing and repairing an automotive disc type of clutch be well understood. The majority of the disc type clutches which are now in use in the automotive industry and for which my device has been particularly designed consists essentially of the following component parts: the driving element composed of the engine fly wheel and the clutch pressure plate, the driven element composed of the clutch disc or discs and the driven shaft or stub shaft, and the means for engaging and disengaging the driving and driven elements, consisting of the cover plate, pressure springs and actuating levers. In operation, the clutch discs which are faced with heat resistant friction facing rings, are compressed between the pressure plate and the driving element or fly wheel in order to effect an engagement of the clutch. These parts are subjected to unusually rigorous conditions of usage. In order that the clutch as a whole might function properly, it is necessary that the clutch discs be in proper alignment, that the movement of the pressure plate be adjusted to certain definite limits, and finally, that the clutch parts engage and disengage with an even, uniform action.

Now referring more particularly to the drawings, there is shown therein a base member 1 which is supported by a plurality of legs 2 which in the present embodiment are three in number. Openings 3 are provided in the extremities of the legs 2 for the reception of suitable fastening bolts in order that the device may be properly secured to a work bench. The upper surface of the base 1 is in the form of a plane, circular surface 4. T-shaped slots 5 extend radially from the center of the top 4 of the base member. The heads of bolts 6 are adapted to be removably inserted into the T-shaped slots 5. A spacing sleeve 7 fits down over the bolt 6, and nuts 8 secured to the upper ends of the bolts serve to secure the bolts in position and to attach the clutch assembly to the surface 4 of the base 1.

A shaft or spindle 9 is journalled centrally of the base 1 as indicated by the reference numeral 10. The lower end of the shaft 9 is threadably engaged by a nut 11. The nut 11 in turn bears against a roller bearing 12. The nut 11 has several flat sides as indicated at 13 and rounded corners as indicated at 14, in order that it may rotate within the annular housing 15. A cover plate 16 is secured to the bottom of the housing 15 by means of suitable fastening screws, and prevents the nut 11 from dropping out when the spindle 9 is unscrewed from the nut. A shaft 17 has one end extending through the wall of the housing 15 in order that it might bear against any one of the flat sides 13 of the nut 11. The other end of the shaft 17 extends toward the exterior of the base 1 and has attached thereon a knurled knob 18. The knob 18 is threadably engaged as at 19 with a boss 20 on the base member 1. It will thus be seen that rotation of the knob 18 will serve to draw the shaft 17 inwardly or outwardly as the case may be, and accordingly, to lock for release the nut 11 against rotation. A collar 21 is loosely mounted on the upper end of the shaft 9. An enlarged wing nut 22 threadably engages the upper end of the shaft 9. A ball bearing 23 separates the collar 21 from the wing nut 22. The extreme upper end of the shaft 9 is provided with a transverse slot 24 in which a flat bar or similar operating tool may be inserted to rotate the spindle 9 for purposes which shall hereinafter become apparent.

Referring particularly to Fig. 1, a clutch assembly has been shown therein in position on the above-described testing device. Briefly stated, the clutch assembly consists of the pressure plate 25 which is adapted to bear against the driven clutch plates 26 and the intermediate spacing plate 27. It is to be noted that in some clutch constructions the intermediate spacing plate 27 is omitted. A plurality of bolts 28, only one of which is shown, connect the pressure plate 25 with the outer ends of the actuating levers 29. The actuating levers 29 extend through the cover plate 30 and converge at a central point, where they are contacted by the collar 21. The spring 31 tends to force the pressure plate 25 to compress the clutch plates 26 into engagement with the driving element, which in this instance, is represented by the top surface 4 of the base 1. The cover plate and other component parts of the clutch assembly are secured to the base 1 as in actual operative assembly by means of the previously described bolt 6 and sleeve 7. The clutch plates 26 are secured to a central hub 32 by means of fastening bolts 33. The interior of the hub is splined and adapted to be engaged by a spline 34 on the spindle 9.

The testing operation of the above-described clutch assembly is effected as follows: The wing nut 22 is turned down on the spindle 9, thereby forcing the collar 21 to depress the levers 29. When the levers 29 have been depressed to a position which should correspond to complete disengagement of the clutch in actual operation, the rod 17 is released by means of turning the knob 18 so that the nut 11 and spindle 9 may then be rotated. A flat bar is then inserted in the slot 24 and the spindle 9, together with the driven elements consisting of the clutch discs 26 and the hub 32 are rotated while the remainder of the clutch assembly remains stationary. In this manner it may be ascertained whether the parts are functioning properly. If, for example, one of the clutch plates 26 is out of line or warped, the spindle will not rotate freely and properly. Similarly, if the cover plate is damaged or bent so that the pressure plate cannot be properly withdrawn from engaging position, such a defect will immediately become apparent when it is attempted to rotate the parts.

By this above-described method of testing, the entire clutch assembly may be properly repaired and checked, and any defects noted before it is finally assembled for actual use. Defects which would otherwise not be apparent would still be left in the clutch assembly, and would be highly instrumental in producing an inferior repair job.

It is also desirable to check the amount of pressure which is necessary to actuate the clutch levers 29. Certain actuating pressure specifications are prescribed by the clutch manufacturer. An actuating pressure below the prescribed value usually means that the pressure springs 31 have become broken or weakened. An actuating pressure above such limit is usually ascribable to the facts that the parts are binding one upon the other and not working with the proper freedom. The device illustrated in Fig. 5 serves as a means for gauging the amount of pressure which is exerted upon the actuating levers 29. This device consists of a pair of cup-shaped members 35 and 36 which are separated by a coil spring 37. The cup-shaped members 35 and 36 are of such dimensions that they may be telescoped one within the other. A scale indicated by the reference numeral 38 is marked upon the outside of the smaller cup 35. The upper edge of the lower and larger cup 36 will proceed along this scale, as the spring 37 is compressed and the two cups forced closer together. When the levers 29 have been moved to their proper position, the pressure necessary to actuate them may be then read from the scale 38.

Referring to Fig. 2, means have also been provided for aiding in the dismantling and rebuilding of the clutch assembly. A disc or adapter 40 carries a coil spring 41 and a ring 42. The spindle 9, together with the hub 33 and clutch plates 26 are fitted down over the spindle, and the ring 42 is forced up against the lower heads of the bolts 33. In this manner the bolts 33 are retained in assembled position while their fastening nuts are removed or attached.

A measuring gauge or indicator 45 is secured by means of a fastening nut 46 to the supporting bar 47. The lower end of the bar 47 is received in a complementary recess in the boss 48 on the edge of the base 1. A small collar 49 fits over the supporting bar 47 and rests on the surface 4. A suitable set screw (not shown) threadably engages with the collar 49 and bears against the bar 47 for retaining the latter in any desired position of height. It will thus be seen that the indicator 45 may be swung on an arc about the base of the bar 47. The contact point 50 of the indicator will bear against the friction facings of the clutch and serve as a means for checking the alignment of the facings of clutch discs 26 and also as a means for revealing high or low spots which it might be desirable to eliminate. In some clutch assemblies small leaf springs are attached to the face of the spacer plates 27 for the purpose of forcing the latter away from the fly wheel or the pressure plate. It is obvious that the indicator 45 may also be used to check the alignment of such last-mentioned springs.

The drilled hole 51 is also provided for the insertion of the lower end of the supporting bar 47, in the event that smaller sized clutch assemblies are to be tested or rebuilt on the device.

In Figs. 6 and 7 a modified form of construction is illustrated. This latter form of construction is designed to be less expensive than that heretofore shown and described. Since at the present time there are about twenty different sizes of clutch asemblies now in use, it is necessary that the splined shaft 9 be supplied in about twenty different sizes ranging from 1⅜ of an inch in diameter to two inches. This of course represents a relatively expensive investment. Therefore, in order to provide a single shaft for the device which will uniformly accommodate several sizes of clutch assemblies or clutch plates, the construction shown in Fig. 6 and Fig. 7 has been devised.

In this latter form of construction, the base member 1 and its essential pertinent parts such as the clamping bolt 6 and sleeve 7 are identical to those shown in Fig. 1. However, the central shaft is changed to the form as indicated by the reference numeral 60. The central shaft 60 in this case is threaded over a substantial portion of its lower end. A cone shaped collar 61 fits over the lower theaded portion and abuts against the shoulder 62 on the shaft 60. A cone-shaped nut 63, having the hexagonal portion 64 for the reception of a wrench, threadably engages with the lower end of the shaft 60. The conical surfaces of the collar 61 and the nut 63 are then adapted to engage with the beveled or conical edges of the interior spline of the clutch plate hub 65. Such beveled edges are present in all splined hub constructions. Therefore, it will be seen that the collar 61 and nut 63 will serve as means for securely gripping a variety of sizes of clutch plate hubs.

In the illustrative instance as shown in Fig. 6, a single plate clutch assembly has been shown. The component parts of such an assembly are similar to those as already described in connection with Fig. 1, with the exception that the spacer plate 27 and an additional clutch plate 26 are omitted.

The construction of the member which engages the bottom or lower end of the shaft 60 may also be slightly modified from that which has heretofore been described. In the modified form of construction, the member or nut which engages the lower end of the shaft 60 is in the form of a flanged sleeve 66. The flanged portion of the sleeve 66 has a plurality of channels or recesses 67 in its outer periphery for the reception of the end of the locking bar 68. A transverse lever 69 may be positioned on the outer end of the bar 68. A lug 70 extends from the side of the base member 1 and the lever or handle 69 may be pulled out and turned to rest on the end of the lug 70 for the purpose of moving the bar 68 into unlocked position. A coiled spring 71 is positioned between the boss 20 and the flange or washer 72 on the bar 68 for the purpose of tending to urge the latter into locking position.

It should also be noted that a slight clearance designated by the numeral 73 is permitted between the sides of the flanged portion of the sleeve or nut 66 and the confining walls of the housing. In this instance, the confining walls of the housing are represented by the bearing 12 and the cover plate 16. There is a definite reason for the provision of this clearance space 73. When the shaft 60 is threaded into the sleeve 66, the latter will of course be locked against rotation and resting in contact with the cover plate 16. When the wing nut 22 is turned down on the shaft 60 to actuate the clutch levers 29 and compress the springs 31, the shaft 60 will correspondingly move upwardly a distance corresponding to the clearance 73. Simultaneously the driven member or clutch plate 26' will be raised a distance equal to the clearance 73 from the surface 4. Further actuation of the levers 29 will of course separate the pressure plate 25' from the driven plate 26'. The shaft 60 may then be rotated for the purpose of testing the movement of the clutch assembly when in disengaged position. By virtue of the provision of the clearance space 73, two objects are accomplished. First, the flanged sleeve 66 is moved to the limit of its upward motion and into contact with the bearing 12. In this manner, the subsequent rotation of the shaft 60 will not tend to screw the shaft further down into the flanged sleeve 66 and thereby place the clutch plate 26' into possible contact with the surface 4, but will operate as an insurance that the clutch plate 26' remains in a certain definite position out of contact with the surface 4. A further reason for the provision of the clearance 73, which in practice is usually made about 3/64 of an inch in extent, is that an additional check may be provided on the proper alignment and clearance of the clutch plate 26' with respect to the surface 4. If the clutch plate is so warped or out of line that even after it has been raised or moved 3/64 of an inch for example from the surface 4, and is not out of contact therewith, the operator will then be apprised of the fact that the plate is not suitable for further use and that it is to be discarded and replaced.

Other modes of applying the principle of my invention may be employed instead of the one explained, change being made as regards the mechanism herein disclosed, provided the means stated by any of the following claims or the equivalent of such stated means be employed.

I claim:

1. In a device for testing and rebuilding clutches composed of driving members, driven members, and actuating levers for engaging and disengaging said members, the combination of means for securing the clutch to said device as in operative assembly, means for operating said levers, and means for measuring the operating pressure applied to said levers.

2. In a device for testing and rebuilding clutches composed of driving members, driven members, and actuating levers for engaging and disengaging said members, the combination of a base member in said device having a plane surface corresponding to a driving element or fly wheel, a shaft journalled in and extending perpendicularly from said base member, said shaft corresponding to a driven shaft in said clutch when in operative assembly, means on said shaft for engaging with said driven members, means for rotating said shaft, means on said shaft for operating said levers, and means for measuring the operating pressure applied to said levers.

3. In a device for testing and rebuilding clutches composed of driving members, driven members, and means for engaging and disengaging said members, the combination of a base member in said device having a plane surface corresponding to a driving element or fly wheel, a shaft journalled in and extending perpendicularly from said base member, said shaft corresponding to a driven shaft in said clutch when in operative assembly, means on said shaft for engaging with said driven members, means for rotating said shaft, and means for checking the radial alignment of said driven members.

4. In a device for testing and rebuilding clutches composed of driving members, driven members, and means for engaging and disengaging said members, the combination of a fixed base member, means for rotating said driven members with respect to said base member, and means for actuating said engaging and disengaging means and maintaining the latter in any desired position.

5. In a device for testing and rebuilding clutches composed of driving members, driven members, and means for engaging and disengaging said members, the combination of a fixed base member, means for rotating said driven members with respect to said base member, means for holding said driving members stationary, and means for actuating said engaging and disengaging means and maintaining the latter in any desired position.

6. In a device for testing and rebuilding clutches composed of driving members, driven members, and means for engaging and disengaging said members, the combination of a base member in said device having a plane surface corresponding to a driving element or fly wheel, a shaft journalled in and extending perpendicularly from said base member, said shaft being locked against longitudinal movement with respect to said base member, means on said shaft for engaging with said driven members, and means for rotating said shaft.

7. In a device for testing and rebuilding clutches composed of driving members, driven members, and means for engaging and disengaging said members, the combination of a base member in said device having a plane surface corresponding to a driving element or fly wheel, a shaft journalled in and extending perpendicularly from said base member, said shaft being locked against longitudinal movement with respect to said base member, means on said shaft for engaging with said driven members, means for rotating said shaft, and means for locking said shaft against rotation.

8. In a device for testing and rebuilding clutches composed of driving members, driven members, and means for engaging and disengaging said members, the combination of a base member in said device having a plane surface corresponding to a driving element or fly wheel, a shaft journalled in and extending perpendicularly from said base member, said shaft being locked against longitudinal movement with respect to said base member, means on said shaft for engaging with said driven members, means for rotating said shaft, and means for securing the clutch to said device as in operative assembly.

9. In a device for testing and rebuilding clutches composed of driving members, driven members, and means for engaging and disengaging said members, the combination of a base member in said device having a plane surface corresponding to a driving element or fly wheel, a shaft journalled in and extending perpendicularly from said base member, said shaft being locked against longitudinal movement with respect to said base member, a collar and clamping nut on said shaft for engaging said shaft with various sizes of hubs of said driven members.

10. In a device for testing and rebuilding clutches composed of driving members, driven members, and means for engaging and disengaging said members, the combination of a base member in said device having a plane surface corresponding to a driving element or fly wheel, a shaft journalled in and extending perpendicularly from said base member, a collar and clamping nut on said shaft for engaging said shaft with various sizes of said driven members, and a rotatable member threadably engaging the lower end of said shaft and confined in said base member, said rotatable member being rotatable and slightly movable with respect to said base member in the direction of the axis of said shaft.

11. In a device for testing and rebuilding clutches composed of driving members, driven members, and means for engaging and disengaging said members, the combination of a base member in said device having a plane surface corresponding to a driving element or fly wheel, a shaft journalled in and extending perpendicularly from said base member, said shaft being locked against longitudinal movement with respect to said base member, means on said shaft for engaging with said driven members, means for rotating said shaft, means for securing the clutch to said device as in operative assembly, and means for actuating said engaging and disengaging means and maintaining the latter in any desired position.

12. In a device for testing and rebuilding clutches composed of driving members, driven members, and means for engaging and disengaging said members, the combination of a base member in said device having a plane surface corresponding to a driving element or fly wheel, a shaft journalled in and extending perpendicularly from said base member, said shaft being locked against longitudinal movement with respect to said base member, means on said shaft for engaging with said driven members, means for rotating said shaft, means for securing the clutch to said device as in operative assembly, means for actuating said engaging and disengaging means and maintaining the latter in any desired position, and means for locking said shaft against rotation.

13. In a device for testing and rebuilding clutches having a hub and driven members, and fastening bolts for securing said members to said hub, the combination of a base member, a shaft extending therefrom for engaging the said hub and resilient means carried by said base member and surrounding said shaft and contacting with said bolts for holding the latter in assembled position.

CHARLES B. SPASE.